2,944,082
Patented July 5, 1960

2,944,082

PRODUCTION OF DIETHYLMETHYLAMINE

Jay B. Class, Wilmington, Del., assignor to Hercules Powder Company, Wilmington, Del., a corporation of Delaware No Drawing. Filed Dec. 20, 1957, Ser. No. 703,996

5 Claims. (Cl. 260—583)

This invention relates to the reaction of amines with esters and, more particularly, to the reaction of diethylamine with methyl toluate.

The amidation of organic acid esters with ammonia and organic amines is well known in the art and has been used as a convenient method for preparation of many interesting derivatives. The reaction generally proceeds according to the equation:

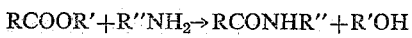

where R″ may be hydrogen, alkyl or aryl.

The present invention is based on the surprising discovery that when amidation conditions are applied to methyl toluate and diethylamine, the principal product is not necessarily the corresponding amide. In accordance with the invention, it has been found that the tertiary amine, diethylmethylamine, is formed in substantial amounts by reaction between methyl toluate and diethylamine under substantially anhydrous conditions at a temperature in the range of about 200° to about 250° C. This discovery is unexpected, since the predominant reaction thus is one of alkylation of the amine by the ester, which may be illustrated as follows:

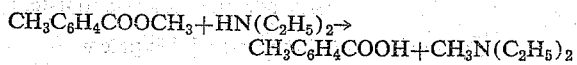

The process of this invention is more particularly set forth in the following specific examples. All parts and percentages in this specification and claims are by weight unless otherwise noted.

Example 1

The methyl toluate utilized in this experiment was 93% pure, analyzing for 2% methyl m-toluate and 91% methyl p-toluate. The diethylamine was substantially pure but contained 0.2% water. The reaction was carried out in a stainless steel bomb adapted to high pressure reactions. To the bomb was charged 565 parts of methyl toluate (corresponding to 3.5 moles of 100% material) and 685 parts (9.4 moles) of diethylamine. The system was flushed with nitrogen and tested to 400 p.s.i., after which the nitrogen pressure was released. The reaction mixture then was heated to 200° C. over a 1.75 hour period and kept at this temperature for 6 hours. The pressure during the reaction was 225 p.s.i. The mixture subsequently was cooled to 40° C., the pressure released and the product, amounting to 1225 parts, was removed.

One thousand one hundred and twenty-seven (1127) parts of the product was charged to a distillation apparatus and was fractionally distilled through a packed column to a pot temperature of 150° C. The recovered amine fraction amounted to 456.8 parts and had a boiling point of 54.5–61° C. The residue amounted to 656 parts.

The recovered amine fraction was analyzed by mass spectrometer and was found to contain 58 mole percent diethylamine and 41 mole percent diethylmethylamine. Ten (10) parts of the fraction was treated with 10 parts of phenylisothiocyanate to react with any primary and secondary amine. The resulting reaction mixture then was fractionally distilled. The first cut, boiling point 51–61° C., amounted to 0.9 part; the second cut, boiling point 61–62° C., amounted to 3.4 parts. The reported boiling point for diethylmethylamine is 63–65° C. A picrate was prepared from the second cut and recrystallized once from water. The crystalline material melted partially at 150–160° C. (melting point of picrate of diethylamine 155°; of ethylamine 165° C.) but the bulk of the crystals melted at 185–187° C. The reported melting point for the picrate of diethylmethylamine is 185° C.

Five hundred (500) parts of the residue from distillation of the reaction product was dissolved in benzene and extracted with aqueous 10% sodium hydroxide. The combined aqueous layers were extracted with benzene which was added to the original benzene layer. The aqueous phase then was acidified to a pH of 2 with HCl and the precipitate of organic acids was filtered off and dried. The dried acids amounted to 299.3 parts and contained 97% p-toluic acid by ultraviolet analysis. Taking into account the total amount of reaction product and the amounts used in the work-up procedure, this 299.3 parts corresponds to a yield of 3.05 moles of 100% toluic acid. The caustic extracted benzene layer was stripped of solvent to 150° C. pot temperature at atmospheric pressure and the residue was then distilled at reduced pressure. Various fractions composed of mixtures of methyl toluate with diethyltoluamide and of pure diethyltoluamide were collected. Upon analysis of the various fractions, it was found that the amount of methyl toluate recovered was 17.6 parts and that the amount of diethyl toluamide was 51.9 parts. On the same basis as that used above to determine total toluic acid, the total amount of methyl toluate recovered was 0.17 mole and the total amount of diethyltoluamide was 0.38 mole.

Example 2

The procedure of Example 1 was substantially duplicated except for carrying out the reaction at 250° C. and under a pressure of 450 p.s.i. The total product recovered amounted to 1237 parts, and 1129 parts was subjected to distillation to recover an amine fraction amounting to 489.3 parts. The residue amounted to 629.3 parts.

As in Example 1, the amine fraction was analyzed and found to contain 53 mole percent diethylamine and 42 mole percent diethylmethylamine. Five hundred (500) parts of the residue resulting from the above distillation was processed as in Example 1 to determine the amount of toluic acid, methyl toluate and diethyltoluamide. One hundred thirty three and one-half (133.5) parts of p-toluic acid of 90% purity was recovered. The amount of methyl toluate was 12.3 parts and the amount of diethyl toluamide was 272.6 parts. Converted to total product basis, the amount of 100% p-toluic acid was 1.22 moles, the amount of methyl toluate was 0.11 mole, and the amount of diethyltoluamide was 1.98 moles.

Example 3

Duplication of the procedure of Example 1 utilizing 395 parts methyl toluate, 480 parts diethylamine and 119 parts of water and a pressure of 490 p.s.i. resulted in a recovered amine fraction containing 26 mole percent diethylmethylamine. p-Toluic acid was recovered to the extent of 1.94 moles. Similarly, duplication of the procedure of Example 2 utilizing 597 parts methyl toluate, 723 parts diethylamine and 180 parts water and a pressure of 875 p.s.i. resulted in a recovered amine fraction containing 19 mole percent diethylmethylamine. The other materials recovered were: p-toluic acid, 1.71 moles;

methyl toluate, 0.04 mole; and diethyltoluamide, 0.73 mole.

Example 4

The reaction also was carried out at a temperature of 150° C. using 563 parts methyl toluate, 685 parts diethylamine, 30 parts of sodium methoxide as catalyst and a pressure of about 200 p.s.i. for a reaction period of 8 hours. The recovered amine fraction contained 10 mole percent diethylmethylamine. The other materials recovered were; p-toluic acid, 1.05 moles; methyl toluate, 1.94 moles; and diethyltoluamide, 0.03 mole.

The examples have shown the claimed process as applied to the methyl esters of a mixture of meta- and para-toluic acids high in para content. However, the methyl esters of other mixtures of the isomeric toluic acids may be used, for example, ortho-meta, ortho-para and ortho-meta-para, and the relative amounts of the isomers may be widely varied. Also, the methyl ester of any one particular toluic acid isomer may be used. The diethylamine used in the process is desirably 100% secondary amine, but small amounts of primary and tertiary amines may be permitted.

Examples 1 and 2 illustrate the preferred conditions for obtaining satisfactory conversion to and yield of diethylmethylamine, namely, use of anhydrous conditions and a temperature in the range of about 200° to about 250° C. Example 3 shows that the presence of water results in a lower conversion, and Example 4 establishes the same finding with respect to use of a temperature below about 200° C. The amount of water should be less than 5% based on total reaction mixture, preferably less than 1% by weight. It also is apparent, from Examples 1 and 2, that another product formed is diethyltoluamide, which is produced in increasing amounts as the reaction temperature is increased to the upper limit of 250° C. At the higher temperatures in the described range, although the principal reaction still is one of alkylation of the amine by the ester, a considerable amount of the toluic acid formed by that reaction does react with the excess diethylamine present to form the amide. The amount of amide produced may be decreased by using lesser amounts of diethylamine than those shown in the examples. For instance, a molar ratio of amine to ester of about 1:1 will keep formation of the amide to a minimum, although some will be formed due to existence of the competitive amide-forming reaction once some toluic acid is present as a result of the alkylation reaction. The mole ratio of diethylamine to methyl toluate may be varied from about 1:1 to about 3:1, with the lower ratio being preferred.

The temperature range of about 200° to about 250° C. is fairly critical in that within this range the best conversions to and yields of diethylmethylamine are obtained. At temperatures below 200° C. the rate of reaction is too low, as evidenced by low conversions and yields of the tertiary amine and low percent methyl toluate reacted. Temperatures above 250° result in the formation of substantial amounts of by-products. The most desirable range of temperature is from about 200° to about 225° C.

The reaction has been shown in the examples as being carried out under pressure but it also is operable at atmospheric pressure. Substantially equivalent results are obtained except that reatcion at atmospheric pressure requires longer to complete. The pressure may be varied from atmospheric to about 1000 p.s.i.

The diethylmethylamine produced by the process of this invention is a typical organic tertiary amine having utility characteristic of such amines, for example, as an organic base capable of forming salts with acids, and as an intermediate in the preparation of quaternary ammonium compounds.

What I claim and desire to protect by Letters Patent is:

1. A process for the preparation of diethylmethylamine by reacting methyl toluate with diethylamine in equimolecular ratio which comprises contacting methyl toluate with diethylamine under substantially anhydrous conditions at a temperature in the range of about 200° to about 250° C. and at a pressure in the range of from atmospheric to about 1000 p.s.i.

2. The process of claim 1 wherein the temperature is about 200° to about 225° C.

3. The process of claim 1 wherein the methyl toluate is methyl m-toluate.

4. The process of claim 1 wherein the methyl toluate is methyl p-toluate.

5. The process of claim 1 wherein the methyl toluate is a mixture of methyl m-toluate and methyl p-toluate.

References Cited in the file of this patent

Mailhe: "Annales de Chimie," vol. 13, series 9, p. 225 (1920).